(12) United States Patent
Iwaki

(10) Patent No.: US 10,559,992 B2
(45) Date of Patent: Feb. 11, 2020

(54) STATOR OF ROTATING ELECTRICAL MACHINE, AND ROTATING ELECTRICAL MACHINE

(71) Applicant: Hitachi Automotive Systems, Ltd., Hitachinaka-shi, Ibaraki (JP)

(72) Inventor: Genzo Iwaki, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 80 days.

(21) Appl. No.: 15/754,424

(22) PCT Filed: Jul. 29, 2016

(86) PCT No.: PCT/JP2016/072255
§ 371 (c)(1),
(2) Date: Feb. 22, 2018

(87) PCT Pub. No.: WO2017/043210
PCT Pub. Date: Mar. 16, 2017

(65) Prior Publication Data
US 2018/0233982 A1     Aug. 16, 2018

(30) Foreign Application Priority Data
Sep. 9, 2015  (JP) .................................. 2015-177139

(51) Int. Cl.
*H02K 3/34* (2006.01)
*H02K 1/16* (2006.01)
(52) U.S. Cl.
CPC ............... *H02K 3/345* (2013.01); *H02K 1/16* (2013.01); *Y02T 10/641* (2013.01)
(58) Field of Classification Search
CPC .. H02K 3/00; H02K 3/30; H02K 3/32; H02K 3/325; H02K 3/34; H02K 3/345;
(Continued)

(56) References Cited

U.S. PATENT DOCUMENTS 8,709,193 B2 * 4/2014 Tada ........................ B32B 27/10
156/272.2
2005/0258703 A1    11/2005 Kouda et al.

FOREIGN PATENT DOCUMENTS

EP    2 153 987 A1    2/2010
JP    53-140100 U1    11/1978
(Continued)

OTHER PUBLICATIONS

Extended European Search Report issued in counterpart European Application No. 16844074.1 dated Apr. 1, 2019 (seven (7) pages).
(Continued)

*Primary Examiner* — Tran N Nguyen
(74) *Attorney, Agent, or Firm* — Crowell & Moring LLP

(57) ABSTRACT

Provided is a stator provided with a high withstand voltage insulating system operable at a high drive voltage without increasing the thickness of a slot insulating paper, and a rotary electric machine incorporating the stator. A stator of a rotary electric machine according to the present invention includes a stator core in which a plurality of slots is formed, a stator coil to be inserted into the slot, and an insulating paper to be inserted into the slot, and insulating the stator coil and the stator core, wherein the insulating paper includes a first insulating paper portion arranged adjacent to the stator core at an outside of an end surface in an axial direction of the slot and at least a second insulating paper portion arranged between the first insulating paper portion and the stator coil, and the insulating paper forms a resin reservoir portion in which an insulating resin is arranged, between the first insulating paper portion and the second insulating paper portion.

6 Claims, 13 Drawing Sheets

(58) Field of Classification Search
CPC ... H02K 3/48; H02K 1/00; H02K 1/16; H01B 3/52; B32B 27/10; B32B 27/16; B32B 27/28; B32B 27/286; B32B 37/10
See application file for complete search history.

(56) References Cited

FOREIGN PATENT DOCUMENTS

| | | |
|---|---|---|
| JP | 58-100443 U | 7/1983 |
| JP | 2006-60929 A | 3/2006 |
| JP | 2008-289284 A | 11/2008 |
| JP | 2014-168330 A | 9/2014 |
| WO | WO 2014/076564 A2 | 5/2014 |

OTHER PUBLICATIONS

International Search Report (PCT/ISA/210) issued in PCT Application No. PCT/JP2016/072255 dated Oct. 25, 2016 with English translation (five pages).
Japanese-language Written Opinion (PCT/ISA/237) issued in PCT Application No. PCT/JP2016/072255 dated Oct. 25, 2016 (four pages).

* cited by examiner

STATOR OF ROTATING ELECTRICAL MACHINE, AND ROTATING ELECTRICAL MACHINE

TECHNICAL FIELD

The present invention relates to a stator of a rotary electric machine and a rotary electric machine, and in particular to a rotary electric machine mounted in an electric vehicle.

BACKGROUND ART

Rotary electric machines that are closely related to industries and daily life are foundation devices that support modern society. Especially, in hybrid cars and electric cars that are becoming popular from the viewpoint of protection of the global environment, reduction in size and weight is required for motors of power sources from the viewpoint of securing of a mounting space and improvement of fuel consumption through the reduction in weight.

Stator slot insulation of a power motor for hybrid cars and electric cars is configured from a slot insulating paper inserted between a stator core and a coil and between different phase coils, and a fixing varnish filled in gaps between the stator core and the coil and between the different phase coils to fix the coil and the slot insulating paper to the stator core.

In the slot insulation, a difference in dielectric constant between the air existing between the slot insulating paper and the stator core, and the slot insulating paper is large near a slot end portion of the stator core, and thus an electric field is concentrated in an air layer near the slot end portion, and partial discharge occurs at a low voltage between the slot insulating paper and the stator core. This partial discharge erodes an insulating layer and is finally led to dielectric breakdown during operation of the motor. Therefore, occurrence of no partial discharge is an essential condition in the stator slot insulation of the power motor for hybrid cars and electric cars.

As means for reduction in size of the power motor, achievement of a high drive voltage is conceivable. To cope with the high drive voltage on an extension of a conventional technique, a technique for increasing the thickness of the slot insulating paper to secure an insulation distance corresponding to a working voltage is conceivable. For example, PTL 1 discloses a technique for adjusting a total thickness of a slot liner by multilayering the slot liner according to a shared voltage.

CITATION LIST

Patent Literature

PTL 1: JP 2006-60929 A

SUMMARY OF INVENTION

Technical Problem

As described above, the technique for increasing the thickness of the slot insulating paper to secure the insulation distance according to the working voltage causes reduction of a coil space factor in the slot and reduction of a coil current. To compensate this point, coil current density needs to be increased. However, coil temperature rise cannot be avoided, and thermal deterioration of an insulation configuration in the slot is accelerated and reliability of an insulating system may be impaired.

An objective of the present invention is to provide a stator provided with a high withstand voltage system capable of alleviating electric field concentration in a slot end portion to withstand a high drive voltage operation while suppressing an increase in thickness of a slot insulating paper, and a rotary electric machine that incorporates the stator.

Solution to Problem

A stator of a rotary electric machine according to the present invention includes a stator core in which a plurality of slots is formed, a stator coil to be inserted into the slot, and an insulating paper to be inserted into the slot, and insulating the stator coil and the stator core, wherein the insulating paper includes a first insulating paper portion arranged adjacent to the stator core at an outside of an end surface in an axial direction of the slot and at least a second insulating paper portion arranged between the first insulating paper portion and the stator coil, and the insulating paper forms a resin reservoir portion in which an insulating resin is arranged, between the first insulating paper portion and the second insulating paper portion.

Advantageous Effects of Invention

According to the present invention, a high drive-voltage small stator capable of reducing electric field concentration occurring in a space area near a slot end portion of a stator core, and a rotary electric machine using the stator can be provided.

DESCRIPTION OF EMBODIMENTS

Hereinafter, a first embodiment by the present invention will be described according to a measurement result of partial discharge inception voltage of an insulation model in which a coil and an insulating paper having respective configurations are incorporated into a core cut out from a stator core having an outer diameter of 245 mm, an inner diameter of 200 mm, the number of slots of 72, and a core thickness of 94 mm. Examples and comparative examples described below are partial models of a stator of a rotary electric machine. However, as is obvious from the description below, the stator of the rotary electric machine is equivalent to an actual stator of a rotary electric machine.

Figure 1:
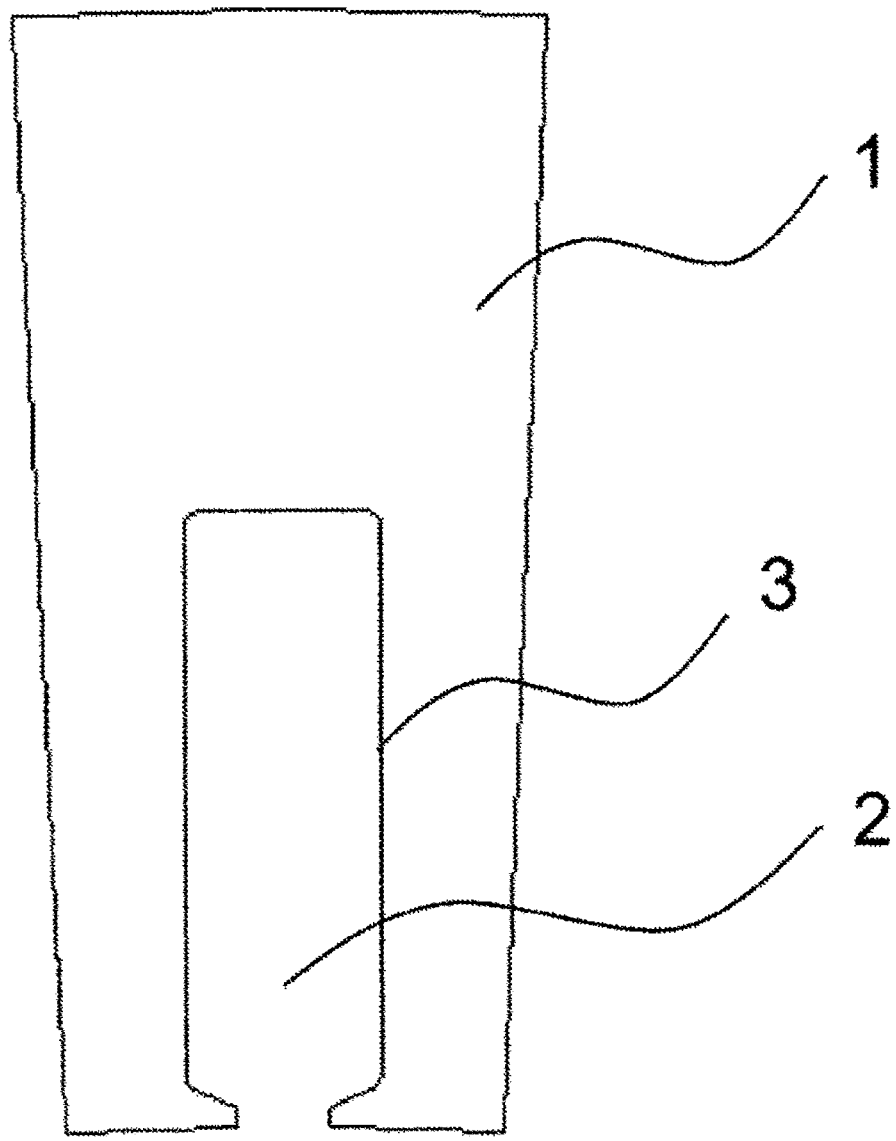
FIG. 1 is a front view of a laminated core used in examples and a comparative example of the present invention.

FIG. 1 illustrates a core end surface shape of a stator core cut out for assembly of an insulation model. The core is obtained by cutting the above-described stator core having an approximately cylindrical shape into a fan shape with a central angle of 5°, and one slot 2 is arranged in the center of an approximately fan-shaped core 1. The shape of a slot end 3 is an approximately rectangular shape having a constant width. The width of the slot end 3 and the depth of parallel portions are 4.18 mm and 12.2 mm, respectively. A punched electrical steel sheet equivalent to 35A300 is used for a laminated core. The laminated cores of the stator core are fixed with a varnish, and the core is not decomposed in cutting the fan-shaped core 1. As the method for cutting the fan-shaped core, wire cutting was used.

In assembly of the insulation model, four flat enamel insulated wires 7 as a simulation coil 6 were arranged in the slot 2 in the center of core 1 via slot insulating papers 4 and 10. The simulation coil and the slot insulating papers in the slot and the stator core were fixed with a varnish. The length of the simulation coil is set to 160 mm and the simulation coil was uniformly extended from both the slot ends by 33 mm. The insulating paper dimensions were 30 mm in width and 100 mm in length, and are extended from both the slot ends by 3 mm from the viewpoint of creeping discharge prevention.

As the flat enamel insulated wire 7, one obtained by coating a flat copper conductor 72 having a short side of 2.7 mm, a long side of 3.6 mm, and a corner chamfering radius of 0.5 mm, with a polyamide-imide insulating layer 71 having the thickness of 0.05 mm, was used. As the fixing varnish, a two-liquid mixing type epoxy resin having a curing condition of 150° C.×1 hour and a glass transition temperature of 125° C. was used. The viscosity after mixing is 0.9 mPa·s. This varnish is the same as the fixing varnish between the fan-shaped laminated cores 1.

In a varnish fixation process in insulation model fabrication, the insulation model was inverted so that the simulation coil faces a vertical direction. First, the fixing varnish from an upper one end of the slot is dropped from above an end of the insulating paper into the slot, and the insulation model was heated and kept at a predetermined temperature to cure the fixing varnish. Next, the insulation model was inverted upside down, and the fixing varnish was dropped and cured by the same method.

Table 1 illustrates insulation model configurations of the evaluated examples and comparative examples. In examples 1 and 2, polyethylene terephthalate (PET) papers having the thicknesses of 0.1 mm and 0.05 mm respectively were used for the insulating papers. In an example 3, an aramid paper having the thickness of 0.05 mm was used for the insulating paper. The insulating papers were multilayered according to the thicknesses of the insulating papers so that a gap between the simulation coil and the core is minimized. In the multilayering of the insulating papers, a plurality of the insulating papers was simply stacked, and no process intended for bonding the multilayered insulating papers was conducted at the time of assembly of the insulation model. Further, in the examples, to position an insulating paper end portion outside a slot end, the insulating paper end portion was bent at the slot end.

In the comparative example, a three-layer laminated paper of aramid paper/PET/aramid paper having the thickness of 0.18 mm, which is an insulating paper typically used in the conventional technique, was used. Layers of the laminate are glued with a urethane-based adhesive. The slot end portion of the comparative example was straight.

TABLE 1

|  | Example 1 | Example 2 | Example 3 | Comparative example |
|---|---|---|---|---|
| Insulating paper | PET | PET | Aramid paper | Three-layer laminate |
| Insulating paper thickness | 0.1 | 0.05 | 0.05 | 0.18 |
| Number of insulating papers | Two | Four | Four | One |
| Application of bending processing for insulating paper end portion | Yes | Yes | Yes | No |
| Varnish reservoir | Yes | Yes | Yes | No |

Figure 2A:
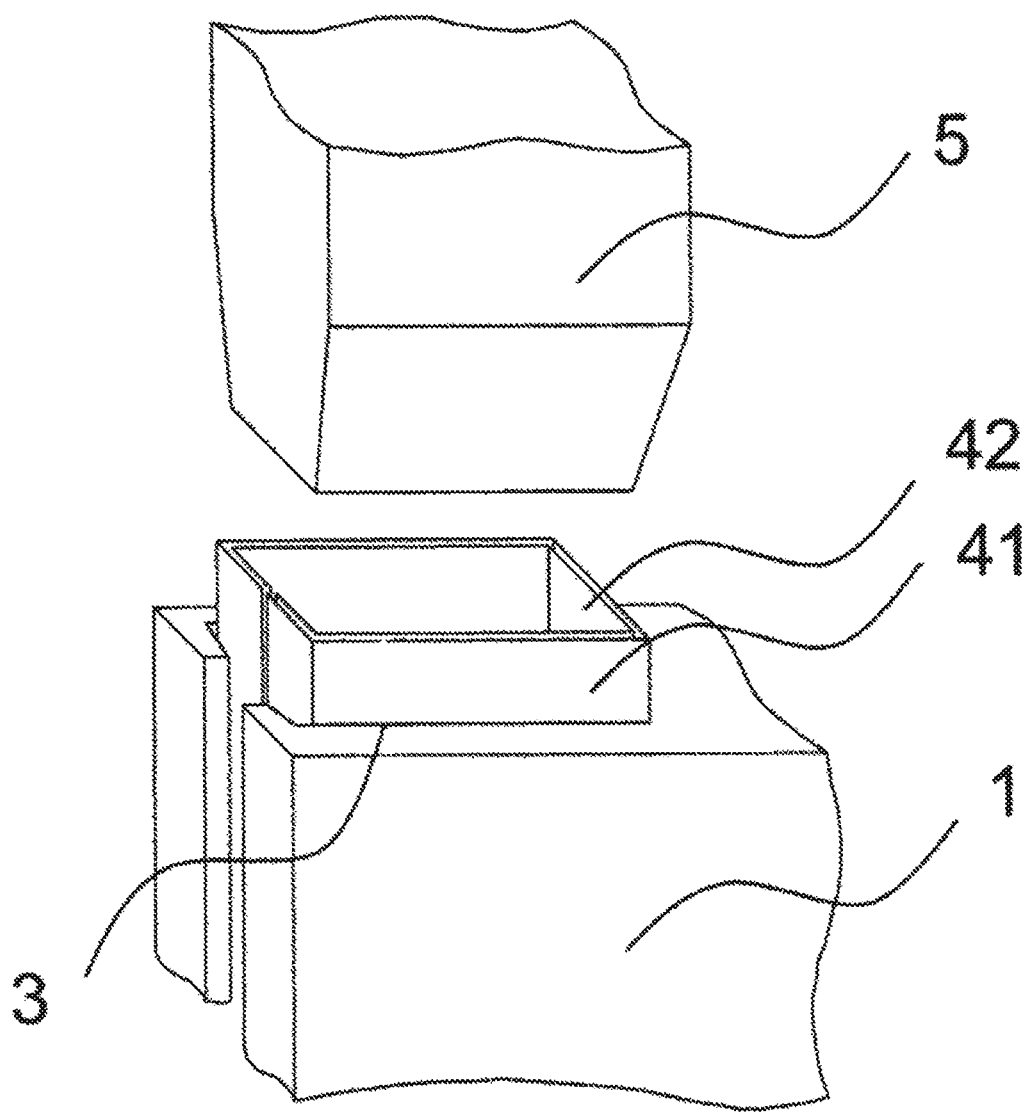
FIG. 2A is a method for bending a slot insulating paper end portion in an example 1 of the present invention.
Figure 2B:
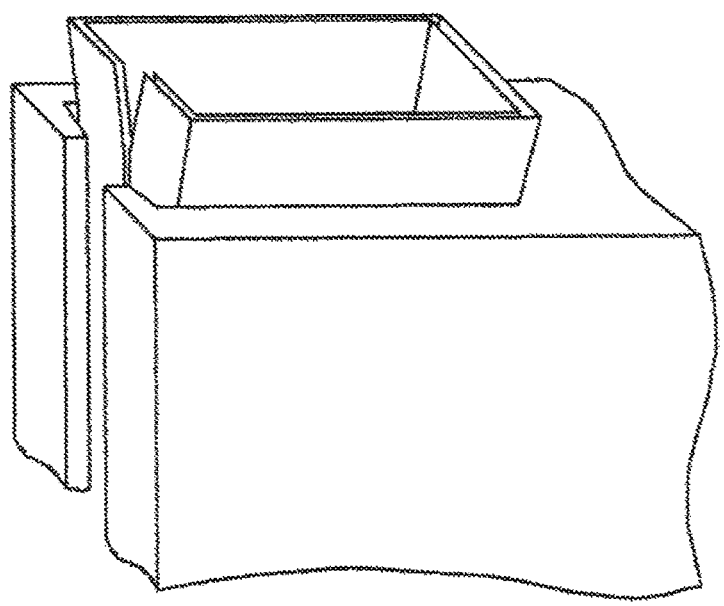
FIG. 2B is a schematic view of the shape of the slot insulating paper end portion after the bending processing in the example 1 of the present invention.

FIGS. 2(a) and 2(b) illustrate schematic views of a method for bending the insulating paper end portion in the example 1. After both a first insulating paper 41 adjacent to the core bent into an in-slot insertion shape, and a second insulating paper 42 arranged between the first insulating paper 41 and the coil 6 are inserted into the slot, a push bending die 5 with a tapered tip end is pushed against the slot end portion not to compress and deform the insulating paper, thereby to provide bending tendency to the insulating paper end portion and arrange the insulating paper end portion outside the slot end. After the bending processing of the insulating paper at the slot end, the flat enamel insulated wire 7 is inserted to form the simulation coil 6.

A slot opening portion side of the push bending die 5 used in the present example is not tapered. This is because a sufficient insulation distance is secured between the simulation coil and the core.

Figure 3A:
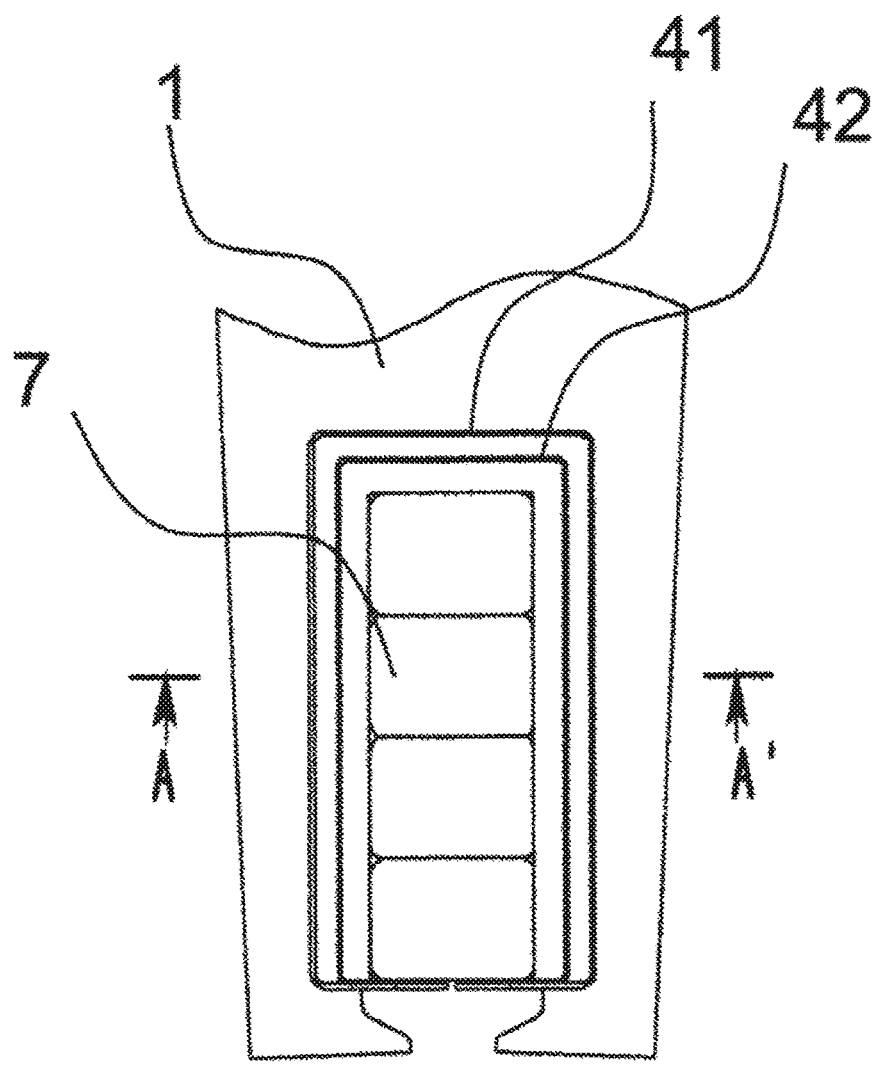
FIG. 3A is a front view of the example 1 of the present invention.
Figure 3B:
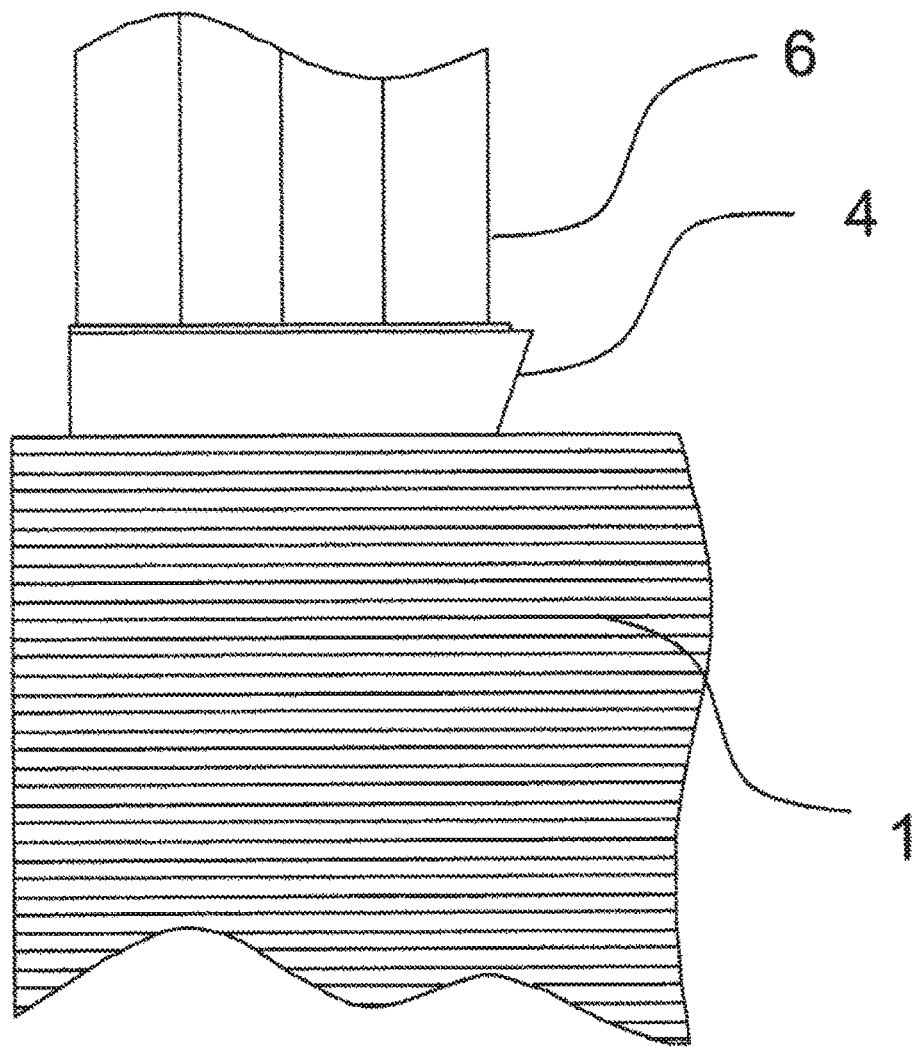
FIG. 3B is a side view of the example 1 of the present invention.

FIGS. 3(a) and 3(b) respectively illustrate schematic views of a front surface and a side surface of the fixation-processed insulation model with a varnish of the example 1. It can be understood that the insulating paper end portions of the first insulating paper 41 and the second insulating paper 42 are located outside the slot end.

Figure 4:
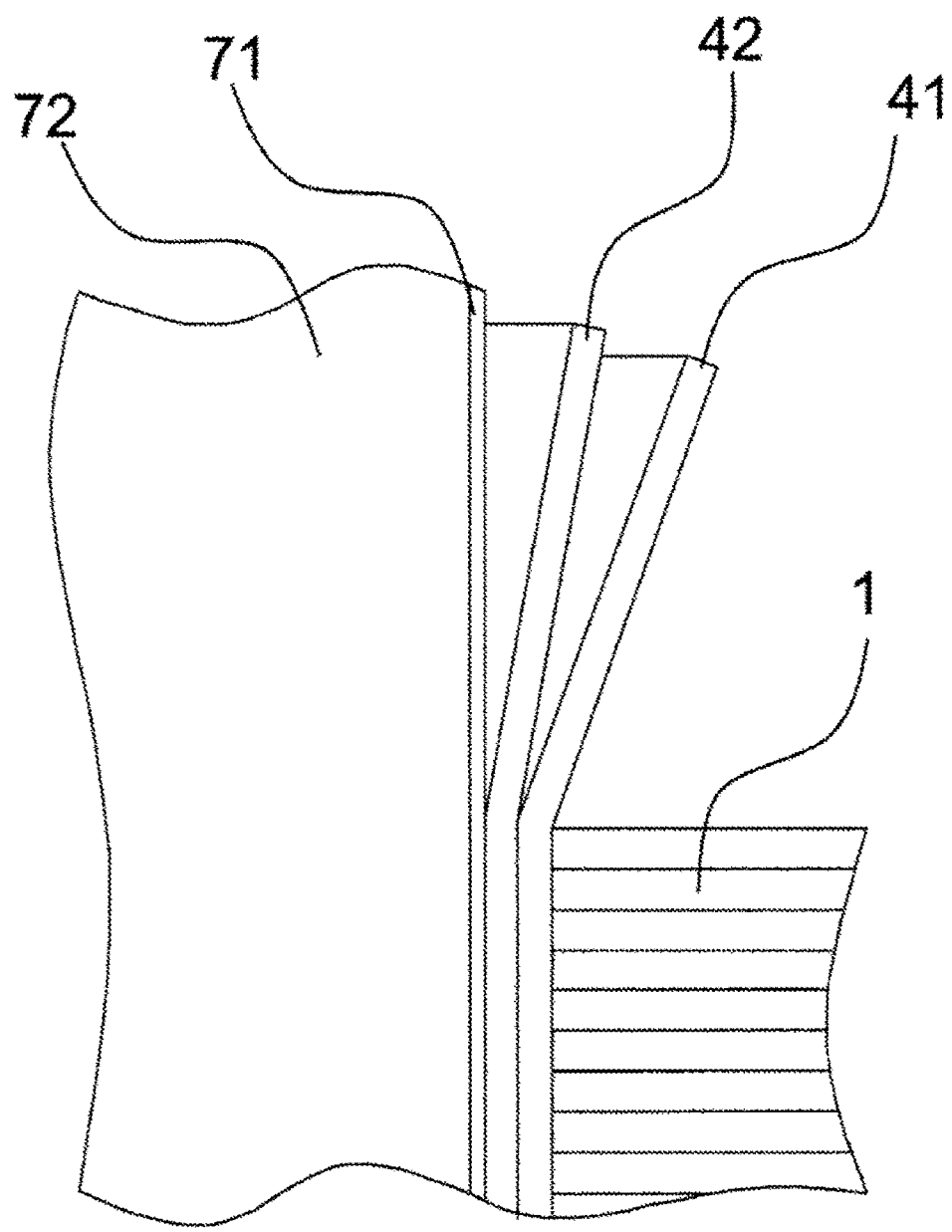
FIG. 4 is an enlarged sectional view in A-A' in FIG. 3, of a vicinity of a slot end portion of the example 1 of the present invention.

FIG. 4 is an enlarged sectional view of an A-A' section near the slot end illustrated in FIG. 3(a). A space is formed between the core 1 and the first insulating paper 41, between the first insulating paper 41 and the second insulating paper 42, and between the second insulating paper 42 and the enamel insulating layer 71 of the simulation coil 6. Electric field concentration at a core end portion, which causes drop of the partial discharge inception voltage, is reduced due to generation of an electric field in the plurality of spaces divided by the insulating papers and formed between the coil conductor 72 and the core 1.

Figure 5:
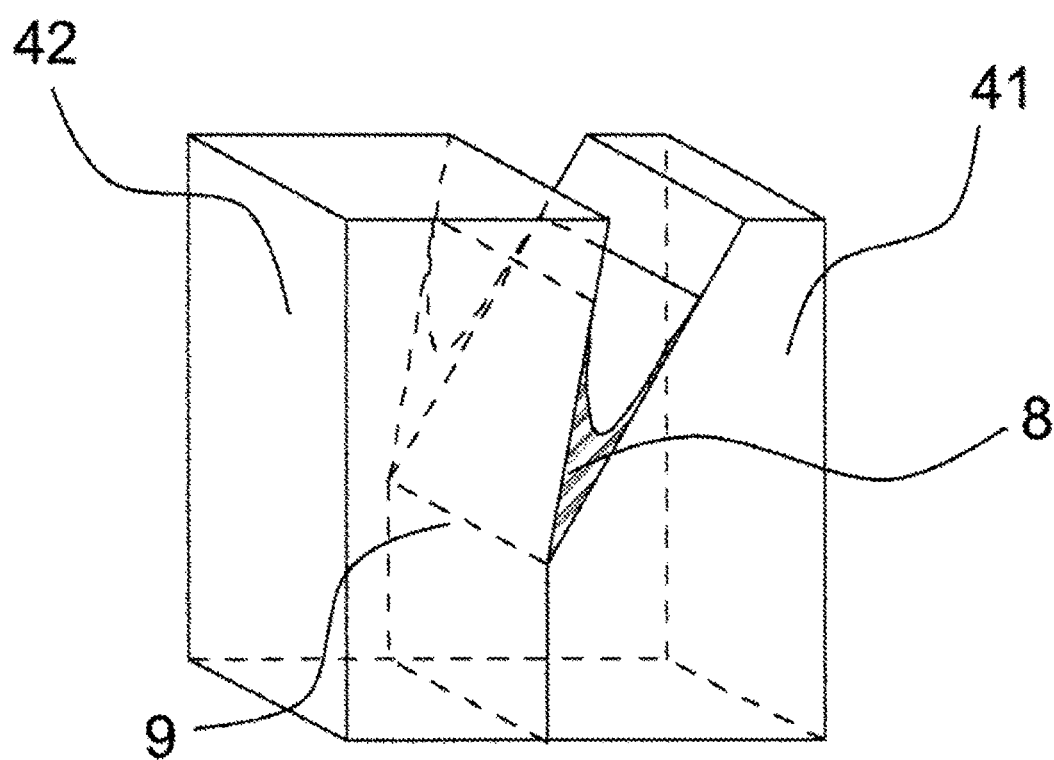
FIG. 5 is a schematic view of a resin reservoir in the example 1 of the present invention.

FIG. 5 is an enlarged schematic view of the space formed between the first insulating paper 41 and the second insulating paper 42 in FIG. 4 near a cross line 9 of both the insulating papers. It has been confirmed that a fixing varnish is filled to connect the first insulating paper 41 and the second insulating paper 42, having the crossing line as a bottom portion, and formation of a varnish reservoir 8 was confirmed. This varnish reservoir can make the insulation distance between the conductor coil and the core long, the insulation distance needing to be kept in mind in insulation design in slot end portion insulation. As a result, the electric field is reduced. Note that it has been confirmed that such a varnish reservoir is also formed in the other examples.

Figure 6A:
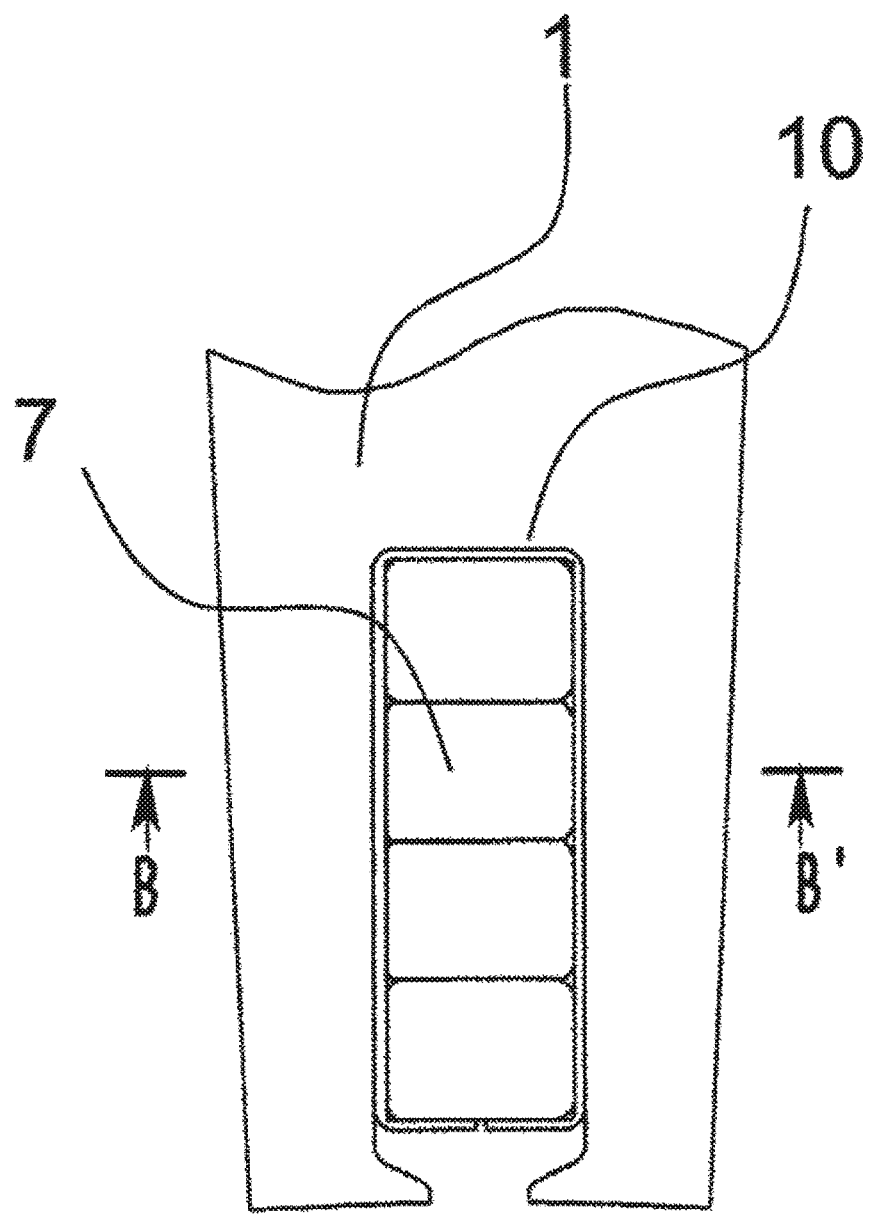
FIG. 6A is a front view of a comparative example of the present invention.
Figure 6B:
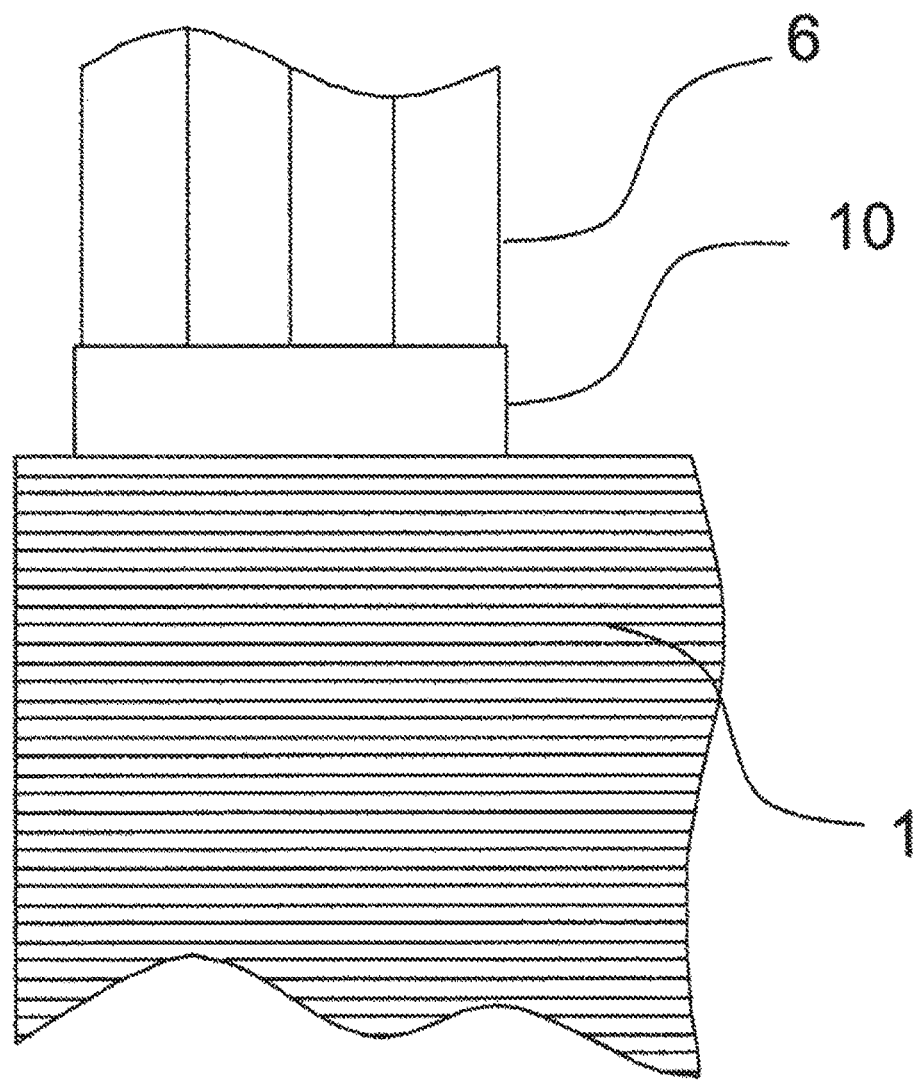
FIG. 6B is a side view of the comparative example of the present invention.
Figure 7:
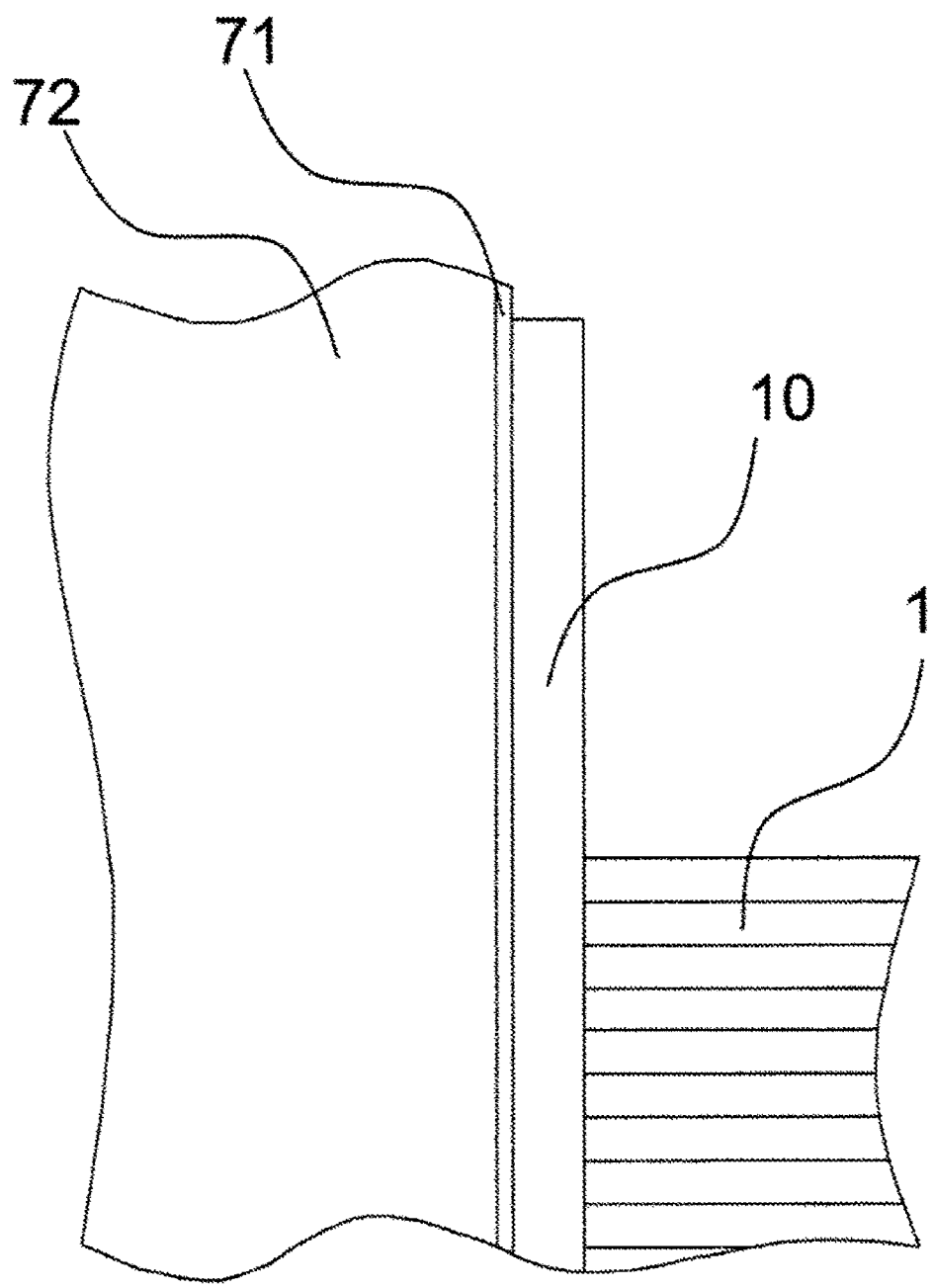
FIG. 7 is an enlarged sectional view in B-B' in FIG. 6, of a vicinity of a slot end portion of the comparative example of the present invention.

FIGS. 6 and 7 illustrate forms of the insulation model produced as comparative examples for the purpose of comparison with FIGS. 3 and 4. From the comparative example of FIG. 7 that is an enlarged sectional view of a vicinity of the slot end in B-B' in FIG. 6(*a*), a continuous space formed by the three-layer laminate conventional insulating paper 10 and the core 1 exists between the coil conductor 72 and the core 1, and the electric field concentrates on the air layer near the slot end due to the difference in dielectric constant between the conventional insulating paper and the air. Although not illustrated, it has been confirmed that the fixing varnish penetrates between the simulation coil and the insulating paper, and between the insulating paper and the core, of the insulation models produced as the examples and the comparative example in Table 1, and between the multilayer insulating papers of the examples, and the slot configuration components of the insulation models are fixed with the varnish.

Table 2 illustrates measurement results of the partial discharge inception voltage at 50 Hz, of the insulating models produced as the examples and the comparative example illustrated in Table 1. The measurement results of the partial discharge inception voltage were obtained by grounding the core 1 of each insulation model and applying a voltage to the simulation coil 6. The voltage at which the partial discharge charge amount reached 100 pC was employed as the partial discharge inception voltage. The measurement values in Table 2 are illustrated as average values of five times of measurement in all the examples and the comparative example.

An aluminum conductive adhesive tape was wound around a core back portion of the core 1 twice, and a ground cable was attached and fixed on the conductive adhesive tape with a conductive tape. For the simulation coil 6, the enamel insulating layers 71 at the both ends of the four flat enamel insulated wires 7 were removed with a width of about 10 mm, the conductors 72 were exposed, an aluminum foil was wound around the exposed portions, and a charge cable was attached to one side of the aluminum foil electrodes. Formation of the ground electrode on the core side and the charge electrode of the simulation coil was conducted before fixation of the varnish. To prevent adhesion of the varnish to the formed electrodes at the time of fixation, the formed electrodes were covered with a Teflon (registered trademark) adhesive tape, and the covered tape was removed after fixation.

From Table 2, the partial discharge inception voltage was about 1.06 kVrms in the conventional technique, whereas the partial discharge inception voltage rose in any of the examples of the present invention has been verified. Further, the partial discharge inception voltage was higher in the examples 2 and 3 than in the example 1. This is because the number of spaces formed between the insulating papers and the volume of the varnish reservoir were increased due to multilayering.

TABLE 2

| | Example 1 | Example 2 | Example 3 | Comparative Example |
|---|---|---|---|---|
| Partial discharge inception voltage (kVrms) | 1.28 | 1.57 | 1.51 | 1.06 |

The effect has been verified using the PET and aramid paper in the present example. It is easily understood that the insulating resin sheet that can be used in the present invention is not limited to the PET or aramid paper from the above-described mechanism that expresses the effect of the present invention.

Figure 8:
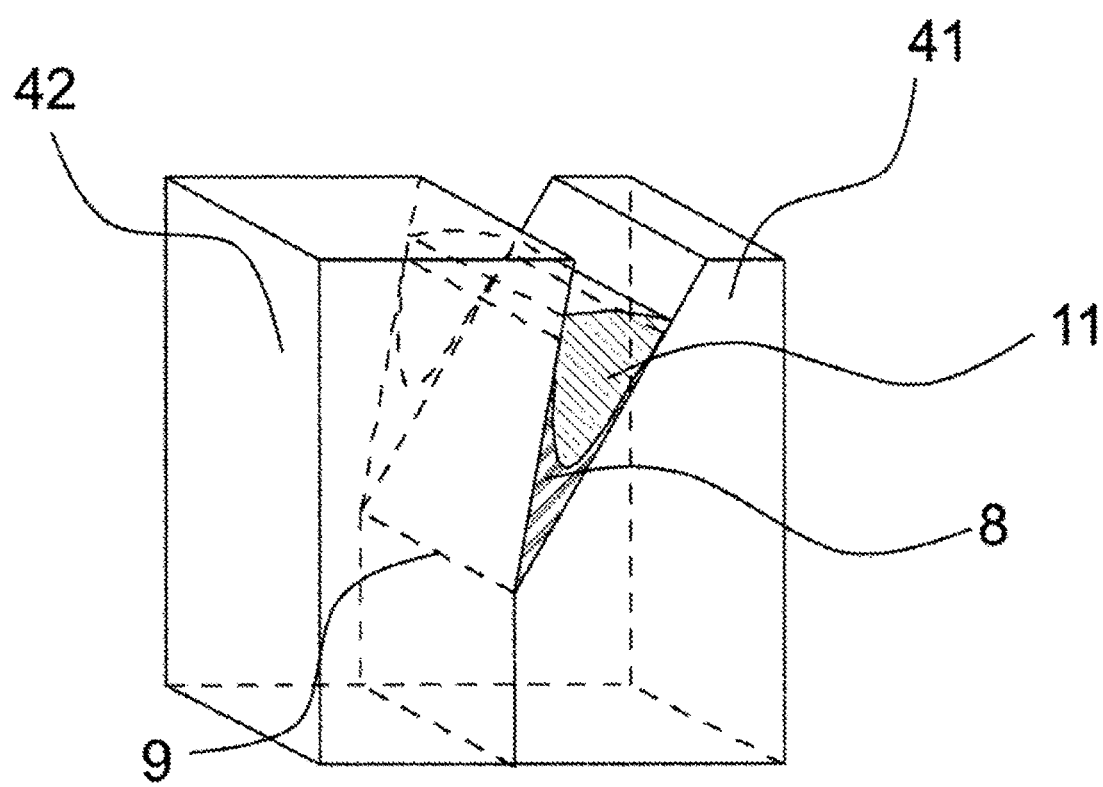
FIG. 8 is a schematic view of a resin reservoir in a second embodiment of the present invention.

Next, a second embodiment of the present invention will be described with reference to FIG. 8. A room-temperature curing-type silicone resin having the viscosity of 0.6 Pa·s was filled in both end portions of insulating papers of an insulation model produced in an example 1 in Table 1, and the effect was verified. FIG. 8 is an enlarged schematic view near a cross line 9 of a first insulating paper 41 and a second insulating paper 42 after the silicone resin is filled and cured. A second resin reservoir layer 11 is newly formed on a fixing varnish reservoir layer 8 that is a first resin reservoir layer.

The partial discharge inception voltage after the silicone resin was additionally filled was measured in a similar manner as in Table 2. In a case of only the fixing varnish reservoir that is the first resin reservoir without the second resin reservoir, the partial discharge inception voltage, which had been 1.28 kVrms illustrated in Table 2, was increased to 1.62 kVrms and the effect of formation of the second resin reservoir was confirmed.

In the second embodiment of the present invention, as described above, the second resin reservoir has been formed of a silicone resin. However, the resin for forming the second resin reservoir used in the present invention is not limited to the silicone resin.

Further, in the second embodiment, the effect has been described according to the example formed of the different resin reservoirs. However, in a case where the resin reservoir with the first fixing varnish is not formed and the fixing varnish penetrates to fix in-slot configuration materials, the resin reservoir can be formed between a coil and an insulating paper, between a core and an insulating paper, and between multilayer insulating papers, by use of the above-described second resin reservoir forming method.

Figure 9:
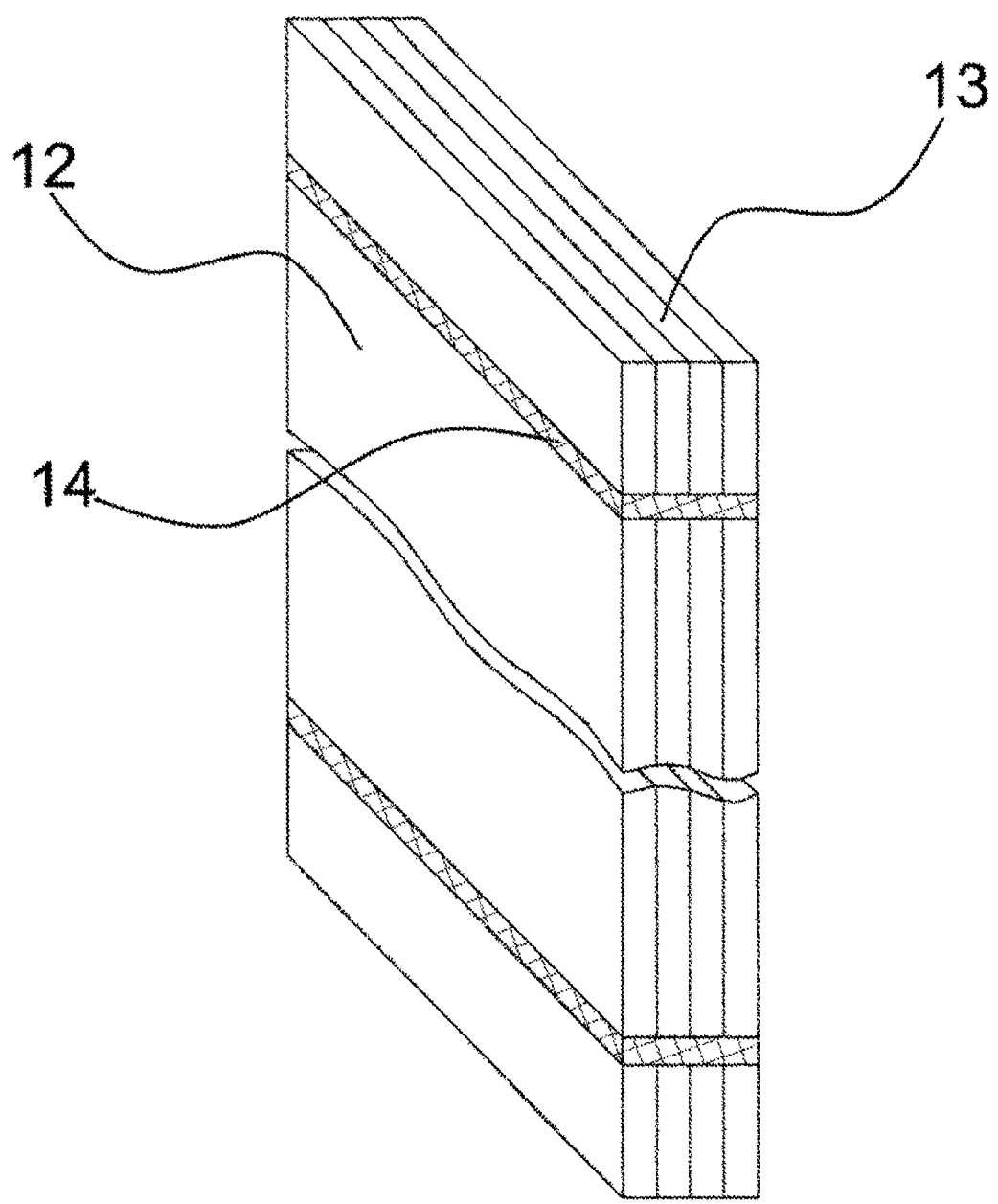
FIG. 9 is a multilayer slot insulating paper in a third embodiment of the present invention.

FIG. 9 illustrates another embodiment regarding formation of a multilayer insulating paper in the present invention. In an example in Table 1, an insulation model was produced with a simple laminated structure in which layers do not adhere to one another. In Table 1, there was no situation where the fixing varnish penetrates between the multilayer insulating papers and the fixing property of the in-slot insulation component is impaired. However, in a case of further improving the partial discharge inception voltage by multilayering, the fixing varnish becomes difficult to penetrate between the insulating papers, and thus the multilayer insulating papers need to be bonded in advance.

FIG. 9 illustrates a form implemented for that purpose, and illustrates a method for forming a multilayer insulating paper 12 of when using an insulating paper configuration of an example 2 in Table 1. A PET sheet 13 having the thickness of 0.05 mm, which was cut into a predetermined size and stacked, was layered, and then portions to be arranged in a slot were ultrasonically bonded to be perpendicular to a slot axis. The layers were fixed by the ultrasonic bonding. After the ultrasonic bonding, bending processing for insertion into the slot was applied. After the insulating paper configuration was inserted into the slot, a non-bonded multilayered layer of a slot end portion was pushed and bent in a similar manner as in the example 2 by the method of FIG. 2 to produce an insulation model as an example in the third embodiment, and its partial discharge inception voltage was measured similarly to the above technique. The fixing varnish processing after insertion of flat enamel insulated wires of a simulation coil is the same method as in the example 2.

The partial discharge inception voltage was 1.65 kVrms, which was higher value than the measurement result of the example 2 illustrated in Table 2. This can be considered that the volume of the varnish reservoir was increased as compared with the example 2 because an ultrasonic bonded portion 14 existing perpendicular to the slot axis direction dams the fixing varnish.

Figure 10:
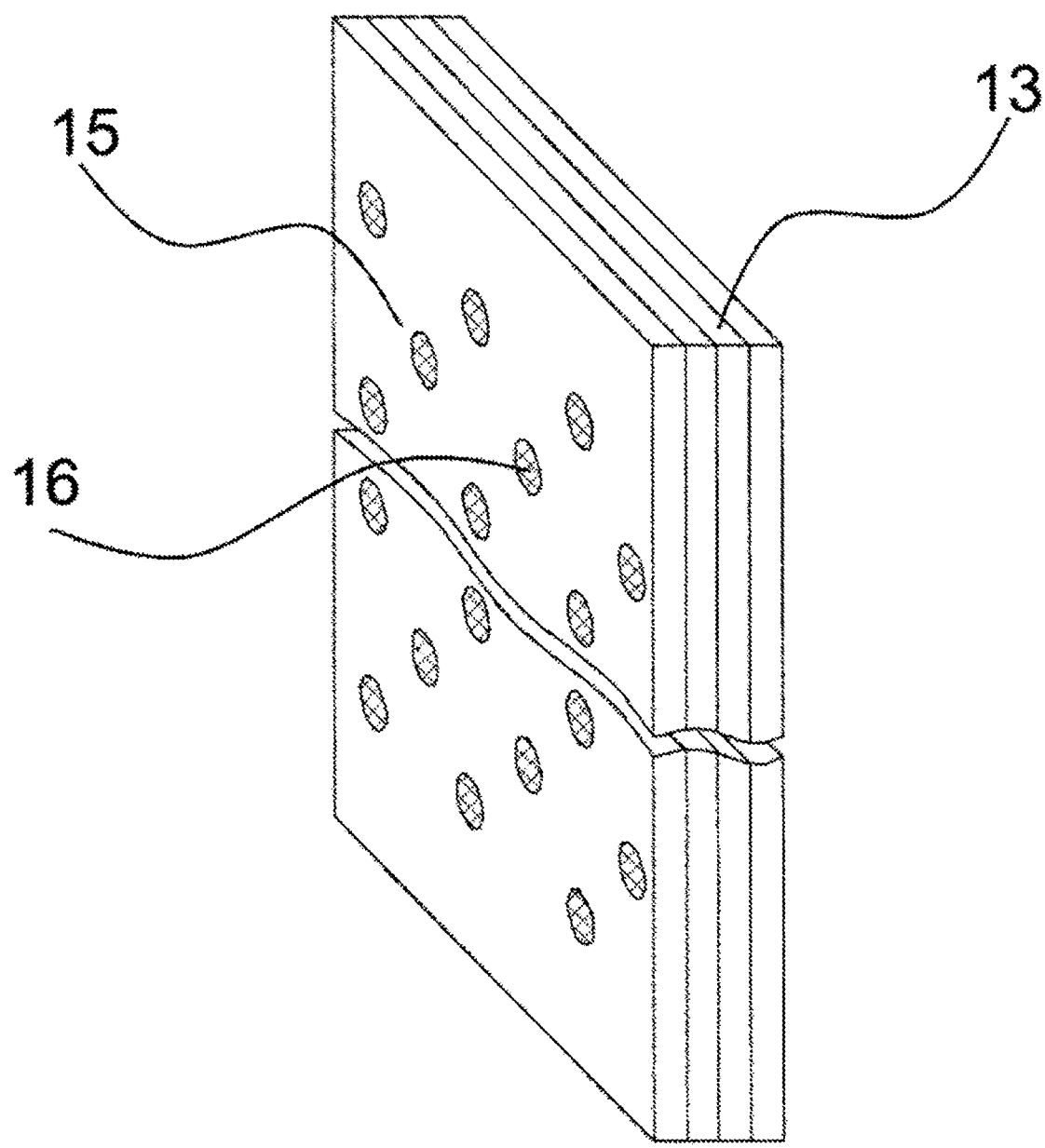
FIG. 10 is a modification in the third embodiment of the present invention.

In FIG. 9, the ultrasonic bonded portion 14 was linearly provided perpendicular to the slot axis. However, a similar effect can be obtained in the form illustrated in FIG. 10. FIG. 10 is a schematic view of a case where a multilayer insulating paper 15 is spot-bonded 16 by ultrasonic waves.

The ultrasonic bonding has been used for the bonding method in the third embodiment in which the bonding of the multilayer insulating paper is described. However, radio frequency bonding, thermal fusion bonding, or an adhesive bonding method by partial application of an adhesive can also be used.

In the present example, an insulation model has been produced and thus the cut insulating papers have been ultrasonic bonded after layered. However, in a case of mass-producing stator cores using the present invention, a multilayer insulating paper wound in a roll manner, which has been bonded at predetermined positions and intervals in accordance with a slot length, can be cut and used.

The present invention has been obtained as a result of keen examination of achievement of a high partial discharge inception voltage in the slot end portion of the stator core, which has been conducted for the purpose of development of a high withstand voltage insulating system corresponding to reduction in size and achievement of a high drive voltage of a high power density motor for hybrid cars and electric cars. It has been found that the electric field concentration near the stator core is reduced by multilayering the slot insulating paper placed between the coil and the stator core near the slot end portion of the stator core to form the resin reservoir between the multilayer insulating papers, and the present invention has been made.

The electric field is concentrated in the air layer near the slot end due to the difference in dielectric constant of the air between the insulating paper of the slot insulating paper and the stator core, in the slot end portion of the stator core, and an increase in the partial discharge inception voltage has been difficult. Therefore, by reducing the electric field concentration in the stator core end portion, the partial discharge inception voltage can be increased.

As means therefor, in the present invention, the slot insulating paper near the slot end portion is multilayered to divide the space between the slot insulating paper and the stator core, which cause the electric field concentration, to reduce the electric field concentration near the slot end portion. In addition, the resin reservoir is formed between the multilayered insulating papers to decrease the electric field between the coil and core. As a result, the electric concentration near the slot end portion can be substantially decreased, and the high partial discharge inception voltage can be achieved.

REFERENCE SIGNS LIST 1 core
2 slot
3 slot end
4 slot insulating paper of example 1
41 first insulating paper
42 second insulating paper
5 push bending die
6 simulation coil
7 flat enamel insulated wire
71 polyimide insulating layer
72 copper conductor
8 varnish reservoir
9 first and second insulating paper cross lines
10 slot insulating paper of Comparative Example
11 second resin reservoir
12 bonded multilayer insulating paper
13 PET sheet
14 ultrasonic bonded portion
15 bonded multilayer insulating paper of another form
16 spot ultrasonic bonded portion

The invention claimed is:

1. A stator of a rotary electric machine, the stator comprising:
a stator core in which a plurality of slots is formed;
a stator coil to be inserted into the slot; and
an insulating paper to be inserted into the slot, and insulating the stator coil and the stator core, wherein
the insulating paper includes a first insulating paper portion arranged adjacent to the stator core at an outside of an end surface in an axial direction of the slot and at least a second insulating paper portion arranged between the first insulating paper portion and the stator coil, and
the insulating paper forms a resin reservoir portion in which an insulating resin is arranged, between the first insulating paper portion and the second insulating paper portion, wherein a lowermost point of the resin reservoir is located outside of the stator core, such that the insulating resin in the resin reservoir is only disposed outside of the stator core.

2. The stator of a rotary electric machine according to claim 1, wherein
an end portion in an axial direction of the second insulating paper portion is arranged closer to the stator coil than an end portion in an axial direction of the first insulating paper portion.

3. The stator of a rotary electric machine according to claim 1, wherein
the resin reservoir portion includes a first resin reservoir portion in which a fixing varnish is arranged and a second resin reservoir portion formed on the first resin reservoir portion.

4. The stator of a rotary electric machine according to claim 1, wherein
the first insulating paper portion and the second insulating paper portion include a bonded portion inside the slot.

5. The stator of a rotary electric machine according to claim 1, wherein
the stator coil is configured from segment winding that configures one turn.

6. A rotary electric machine comprising:
the stator of a rotary electric machine according to claim 1; and
a rotor arranged to have a predetermined gap from the stator.

* * * * *